June 13, 1967 C. F. MILLER 3,325,070

ROTARY WIRE FEED DEVICE

Filed Feb. 17, 1965

Inventor:
C. Fredrick Miller
By Bair, Freeman & Molinare Attys.

United States Patent Office 3,325,070
Patented June 13, 1967

3,325,070

ROTARY WIRE FEED DEVICE

Charles Fredrick Miller, La Habra, Calif., assignor to Basic Products Corporation, Milwaukee, Wis.

Filed Feb. 17, 1965, Ser. No. 433,362
7 Claims. (Cl. 226—7)

This invention relates to a device and method for feeding or transporting wires or filaments, particularly fine wire to be threaded into a minute orifice of an assembly machine. The invention has particular applicability to machines for bonding wires by stitch bonding to semi-conductor devices including semi-conductor dice wherein small gage wire must be threaded into the capillary of a bonding tool and continuously or intermittently fed to the tool as wire is consumed in the bonding operation.

Semi-conductor wire bonding presents particular problems in that the device and contacts thereon are extremely small and the wires to be bonded are so minute (on the order of .0004 to .0007") that all operations must be done under a microscope. In stitch bonding, wire is played out from a source, usually a coil or spool, through the tip of a bonding tool which moves vertically downward to engage a contact on a heated work piece. The bonding tool is then raised and moved to a new bonding position, fresh wire being simultaneously fed down through the tool from the wire source. Such process is repeated until the final bond on any one work piece is made at which time the wire is cut or burned by special shears or torches which leave a short tail at about 90° to the main wire or an enlarged globule on the end of the wire preventing the wire from becoming unthreaded as the tool is moved preparatory to operation on the next work piece.

It is essential that the wire be initially easily and accurately fed to the bonding tool and that the drag on the wire during the bonding operations be sufficient at all times to keep the wire taut while still permitting the wire to feed from the source as needed without rupture.

It is thus an object of this invention to provide a mechanism by which small gage wire may be easily fed to a bonding tool.

Another object of this invention is to provide a simplified method of threading a minute orifice which derives from an improved technique of feeding wire from a feeder assembly.

It is a further object of this invention to provide a wire feed mechanism by which small gage wire may be kept taut during stitch bonding while at the same time maintaining an accurate drag on the wire to prevent rupture of the wire as it is fed through a bonding tool.

Other objects of the invention will become apparent as it is hereinafter described.

Co-pending application Ser. No. 428,132, filed Jan. 26, 1965, and owned by the assignee of this application, describes a vibratory feeder means used in conjunction with a vacuum drag system for controlling wire feed and movement. The present invention is an alternative device to the vibratory feeder.

The invention consists of a rotary wire feed mechanism which may be used in conjunction with a source of small gage wire and a bonding tool into which wire is threaded. In essence, the mechanism is a hollow cylinder with circumferential perforations through which gas is drawn. Wire is attracted to the perforations by in-flowing air and as the cylinder is rotated, the wire is advanced along with the perforations. When the cylinder is stationary, it provides a controlled drag on the wire to keep it taut.

The invention will be better understood from the drawings, wherein.

Figures 1, 2, 3, 4, 5:
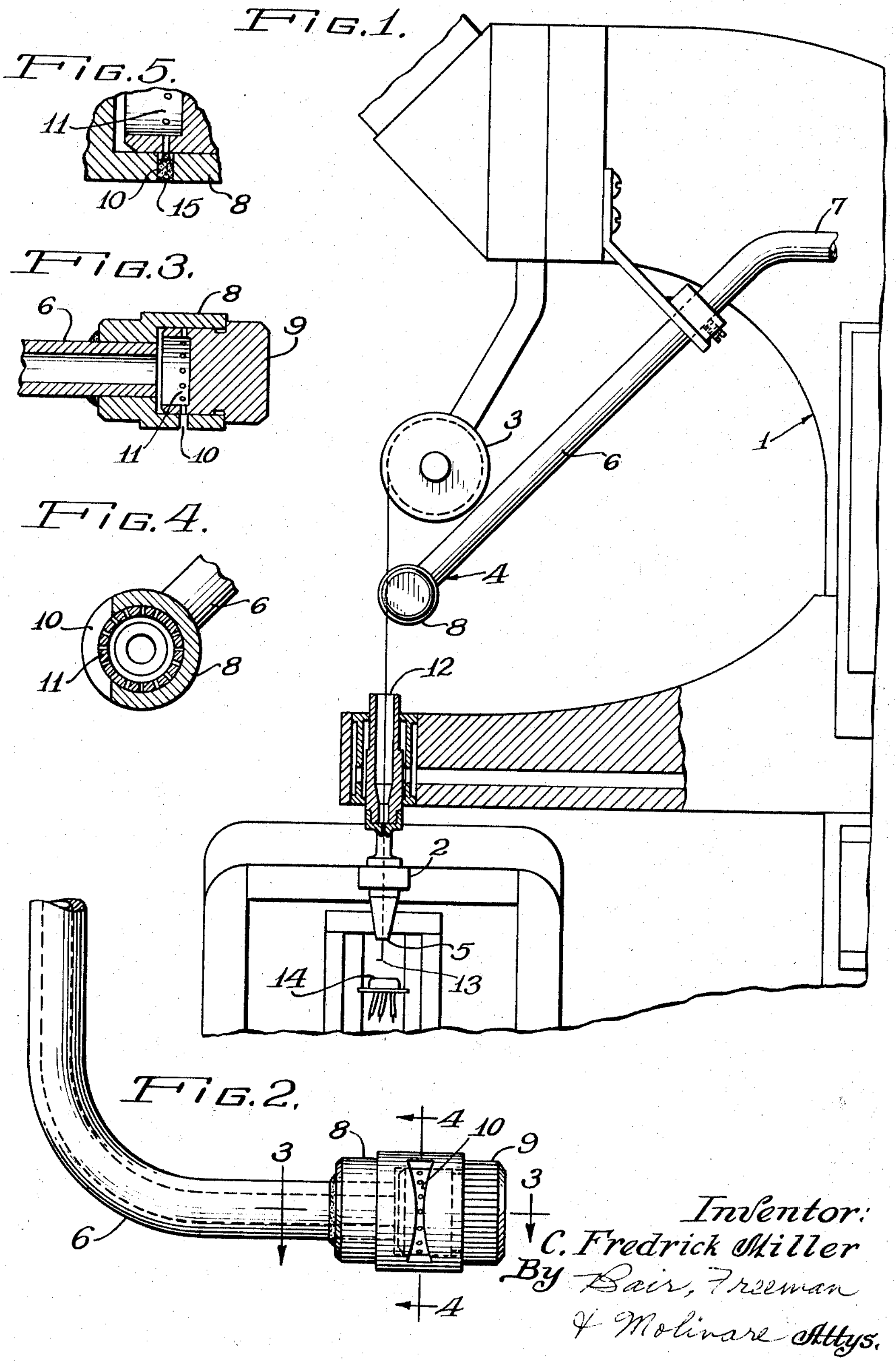
FIG. 1 is a partial side view, partially in section, of a wire bonding machine including the invention.
FIG. 2 is a face view, partially in section, of the rotary feed assembly of the invention.
FIG. 3 is a top view in section along line 3—3 of FIG. 2.
FIG. 4 is an end view in section along line 4—4 of FIG. 2.
FIG. 5 is an enlarged view of the lower portion of FIG. 3 showing one embodiment of the invention.

A wire bonding machine shown generally at 1 in which the invention is particularly useful comprises a bonding head 2, wire storage means 3 and the rotary wire feed device of the invention shown generally at 4. Bonding head 2 has a tip 5 with a minute orifice through which wire is fed. Bonding head 2 is moved vertically up and down by suitable pneumatic, mechanical or hydraulic means, preferably by an air spindle with air bearings as described in co-pending application Ser. No. 437,980, filed Mar. 8, 1965, and owned by the assignee of this application. Wire storage means 3, shown diagrammatically, may be a spool or drum which rotates about its axis to feed wire downwardly to head 2, for example as described in co-pending application Ser. No. 437,134, filed Mar. 4, 1965, and owned by the assignee of this application.

The rotary wire feed device of the invention shown generally at 4 consists of a hollow tubular member 6 with its open end 7 connected to a source of reduced pressure (not shown). At the lower end of tubular member 6 is cylindrical housing 8 best seen in FIG. 3 which is secured to tubular member 6 and houses rotary member 9. Housing 8 is cut away in part at its front portion as shown in FIGS. 2 and 4 so to expose the inner end of rotary member 9. The cut away portion forms a groove 10 (FIG. 2) into which a wire can be laid to contact rotary member 9 and the sides of which confine the wire at its sides.

Rotary member 9 is preferably a hollow cylinder which has its outer end knurled to serve as a hand wheel for rotation. The inner portion 11 is perforated, the perforations permitting communication between the atmosphere and the source of reduced pressure through tubular member 6. The perforations may vary in size and spacing depending upon the size of wire to be attracted and the degree of vacuum maintained.

As air is drawn through groove 10 around the sides of the wire therein and through the perforations of inner portion 11, wire in the groove is drawn into controlled friction engagement with the rotary member 9. Rotation of member 9 by manual turning causes the wire to be advanced axially along groove 10.

In operation of the rotary feed device in conjunction with the bonding head, the reduced pressure system is activated, wire is laid manually into groove 10 and the feed device is rotated to feed wire downward to orifice 12 at the top of the bonding head and subsequently through the head to tip 5. A short tail 13 is put on the end of the wire by a notched shear blade (not shown) to prevent unthreading of the wire through tip 5. The reduced pressure system is activated throughout bonding operations with the member 9 stationary to maintain drag on the wire.

To bond, head 2 is lowered and passes along the wire until tip 5 contacts bent tail 13. The tip then moves the wire, by virtue of contact with the bent tail, to the work shown diagrammatically at 14 as a transistor header. A bond is effected by forcing tip 5 to press the wire against the heated work piece. Successive bonds are made by lifting head 2 and drawing out wire to a new location. After making the last bond on a given work piece, the wire is cut and a new tail is formed.

Drag is required during the bonding operation to hold the wire stationary after cutting so the bonding tip will pass along the wire until the needle end engages the bent tail. Drag is also necessary to control the lay of the wire during movement of the tip to subsequent bonding positions. However, in both of these operations, the drag must be controlled to very fine degree. In the initial movement utilizing the bent tail, too great drag will cause the bent tail to be straightened out. In subsequent movement from one bond position to the next, excessive drag will cause either a ruptured wire or bond.

In the rotary feed device hereinabove described, attraction of the wire to the perforations is relatively insensitive to the level of vacuum which is caused to exist inside the cylindrical member, that is, the level existing in the feeding device. This insensitivity is because flow through the orifices is turbulent. In certain conditions of operation this flow may reach the critical velocity so that the flow is totally independent of the level of vacuum.

Such condition permits varying the level of vacuum for other purposes, such as to vary the force applied for wire bonding when the same reduced pressure source operates the bonding head, (as described in co-pending application Ser. No. 437,980, filed Mar. 8, 1965) while maintaining a constant attraction of the wire to the feeding wheel.

In the situation wherein the attraction of the wire to the perforations is constant, the drag which must be applied to control movement of the wire in the needle during bonding may be varied by applying to the groove a porous member 15 as shown in FIG. 5 through which air is admitted to the perforations. Air passing through porous member 15 drops in pressure as it flows to the vacuum system and this drop in pressure creates a force on the porous member which is thereby transmitted to the wire and creates the drag required. In effect the wire is squeezed between the porous member and the perforated cylinder. The drag may be varied by varying the porosity of the member applied. This variation may be effected either by a variation in the degree of porosity or in the thickness of the member, that is, the length through which air must pass.

Preferably, porous member 15 is a wedge of plastic foam or rubber foam which is held in place in the groove by the force of inflowing gas through the groove or a wedge of sintered or perforated metal of controlled thickness and shape which may be mounted semi-permanently to the feeding device. This wire feed system thereby serves the double purpose of feeding the wire and of applying the drag necessary to control its movement through the needle.

The rotary feed system of this invention differs from the vibratory feed system described in co-pending application Ser. No. 428,132, filed Jan. 26, 1965, principally in that in the vibratory feed system the member through which air is passed is a porous sintered member and in such a system the flow is laminar and varies directly with the pressure drop. In the rotary feed system, flow through the perforated cylinder is turbulent. Since atmospheric pressure may be considered a constant, varying the level of vacuum in a laminar system varies the pressure drop, thereby varying the force of attraction of the wire and this force of attraction may be considered as the braking force. As hereinbefore set out, variation in braking force of the rotary feed system is accomplished by porous wedges.

What is hereinabove shown and described is the preferred embodiment of the invention, it being understood that various changes may be made in the present invention without departing from the principles of the invention within the scope of the appended claims.

I claim:

1. Device for transporting and feeding wire comprising a tube, a source of reduced pressure communicating with said tube, means at one end of said tube defining a groove adapted to hold wire, a hollow cylinder communicating with said tube and adapted to rotate with a portion of its periphery communicating with said groove, said peripheral portion being perforated to permit passage of gas from without said cylinder through said groove to said source of reduced pressure, whereby said wire is held in said groove and attracted to said perforations.

2. Device of claim 1 including means adapted to fit into said groove and contact said wire to provide resistance to axial movement of said wire, said means being sufficiently porous to permit flow of gas from without said cylinder to said source of reduced pressure.

3. Device of claim 1 including means adapted to fit into said groove, said means being sufficiently porous to permit flow of gas therethrough to said source of reduced pressure.

4. Device for transporting and feeding wire comprising a tube, a source of reduced pressure communicating with said tube, said tube housing a cylindrical portion at one end and a circumferential groove in said portion adapted to hold wire, a hollow cylinder rotatably mounted in said cylindrical portion, said cylinder having a plurality of circumferential perforations which communicate with said groove to permit passage of gas from without said cylinder through said groove to said source of reduced pressure.

5. Device for transporting and feeding wire comprising a tube, a source of reduced pressure communicating with said tube, means at the end of said tube defining a groove adapted to hold wire, means rotatable in said tube having a plurality of perforations communicating with said groove and means adapted to fit into said groove, said means being sufficiently porous to permit flow of gas from without said tube through said perforations to said source of reduced pressure.

6. Method of transporting and feeding wire for threading into an orifice comprising the steps of (1) feeding wire against perforations of a convex perforated surface, (2) confining the sides of the wire adjacent to said surface, (3) flowing gas around the confined sides of said wire and through said perforations, and (4) rotating said surface to move said perforations in a direction substantially axial with respect to said wire, whereby said wire is transported along with said perforations.

7. Method of claim 6 wherein said wire is oriented substantially vertically and said perforations are moved downward by rotation of said surface whereby said wire is transported downward.

References Cited

UNITED STATES PATENTS

| | | | |
|---|---|---|---|
| 1,949,237 | 2/1934 | Bradner | 226—195 X |
| 2,871,502 | 2/1959 | Whisnant | 226—95 X |
| 3,186,446 | 6/1965 | Hunt | 228—44 X |

M. HENSON WOOD, Jr., *Primary Examiner.*

R. A. SCHACHER, *Assistant Examiner.*